(12) United States Patent
Ding et al.

(10) Patent No.: US 12,513,602 B2
(45) Date of Patent: Dec. 30, 2025

(54) COMMUNICATION METHOD AND SYSTEM IN WIRELESS LOCAL AREA NETWORK, AND APPARATUS

(71) Applicant: Huawei Technologies Co., Ltd., Shenzhen (CN)

(72) Inventors: Baokun Ding, Nanjing (CN); Chun Pan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 404 days.

(21) Appl. No.: 18/161,360

(22) Filed: Jan. 30, 2023

(65) Prior Publication Data

US 2023/0180106 A1 Jun. 8, 2023

Related U.S. Application Data

(63) Continuation of application No. PCT/CN2021/107890, filed on Jul. 22, 2021.

(30) Foreign Application Priority Data

Jul. 31, 2020 (CN) .......................... 202010761612.8

(51) Int. Cl.
H04W 48/14 (2009.01)
H04W 84/12 (2009.01)

(52) U.S. Cl.
CPC ............ *H04W 48/14* (2013.01); *H04W 84/12* (2013.01)

(58) Field of Classification Search
None
See application file for complete search history.

(56) References Cited

U.S. PATENT DOCUMENTS

| 2015/0230093 | A1 | 8/2015 | Park et al. | |
| 2019/0335454 | A1 | 10/2019 | Huang et al. | |
| 2020/0068486 | A1 | 2/2020 | Asterjadhi et al. | |
| 2020/0221545 | A1* | 7/2020 | Stacey | H04W 84/12 |
| 2021/0112490 | A1* | 4/2021 | Cariou | H04W 84/12 |

FOREIGN PATENT DOCUMENTS

WO WO-2018217310 A1 * 11/2018

OTHER PUBLICATIONS

IEEE Std 802.11k-2008, "Part 11: Wireless LAN Medium Access Control (MAC) and Physical Layer (PHY) Specifications, Amendment 1: Radio Resource Measurement of Wireless LANs ", dated Jun. 12, 2008, total 244 pages.
IEEE Std 802.11v-2011, "Part 11: Wireless LAN Medium Access Control (MAC) and Physical Layer (PHY) specifications, Amendment 8: IEEE 802.11 Wireless Network Management", dated Feb. 9, 2011, total 433 pages.
IEEE P802.11be_D0.01, "Part 11: Wireless LAN Medium Access Control (MAC) and Physical Layer (PHY) Specifications, Amendment 7: Enhancements for extremely high throughput (EHT)", dated Jul. 7, 2020, total 33 pages.

* cited by examiner

*Primary Examiner* — Hong S Cho
(74) *Attorney, Agent, or Firm* — Slater Matsil, LLP

(57) ABSTRACT

A communication method and system in a WLAN, and an apparatus, are disclosed. An access point device sends a first frame to a non-access point device. The first frame includes one or more groups of access point parameters. At least one group of the access point parameters includes parameters of a plurality of access points belonging to one neighbor device. The neighbor device is an access point multi-link device. The non-access point device is associated with the access point device.

20 Claims, 11 Drawing Sheets

| Category (category) | Radio measurement action (radio measurement action) | Dialog token (dialog token) | SSID | LCI measurement request (location configuration information measurement request) | Location civic measurement request (location civic measurement request) |

FIG. 3

| Category (category) | Radio measurement action (radio measurement action) | Dialog token (dialog token) | Neighbor report elements (neighbor report elements) |

FIG. 4

| Element ID (element ID) | Length (length) | BSSID | BSSID information (BSSID information) | Operating class (operating class) | Channel number (channel number) | PHY type (physical type) | Subelements (subelements) |

FIG. 5

| Category (category) | WNM action | Dialog token (dialog token) | BSS transition query reason (BSS transition query reason) | BSS transition candidate list entries (BSS transition candidate list entries) |

| Category (category) | WNM action | Dialog token (dialog token) | Request mode (request mode) | Disassociation timer (disassociation timer) | Validity interval (validity interval) | BSS termination duration (BSS termination duration) | Dialog information URL | BSS transition candidate list entries (BSS transition candidate list entries) |
|---|---|---|---|---|---|---|---|---|

FIG. 9

| Category (category) | WNM action | Dialog token (dialog token) | BTM status code | BSS termination delay (BSS termination delay) | Target BSSID | BSS transition candidate list entries (BSS transition candidate list entries) |
|---|---|---|---|---|---|---|
| | | | | | | |
FIG. 10
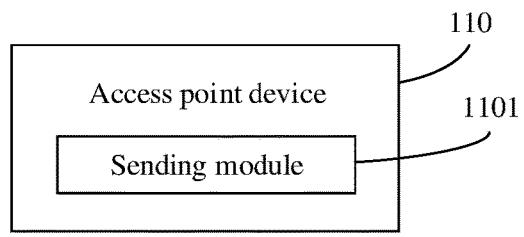
FIG. 11
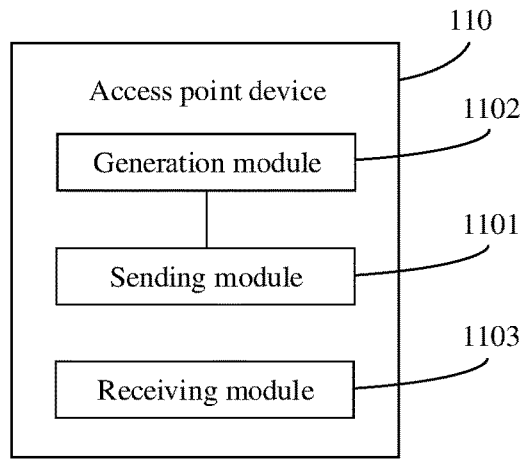
FIG. 12

COMMUNICATION METHOD AND SYSTEM IN WIRELESS LOCAL AREA NETWORK, AND APPARATUS

CROSS-REFERENCE TO RELATED APPLICATIONS

This application is a continuation of International Application No. PCT/CN2021/107890, filed on Jul. 22, 2021, which claims priority to Chinese Patent Application No. 202010761612.8, filed on Jul. 31, 2020. The disclosures of the aforementioned applications are hereby incorporated by reference in their entireties.

TECHNICAL FIELD

This application relates to the field of wireless communications technologies, and in particular, to a communication method and system in a wireless local area network (WLAN), and an apparatus.

BACKGROUND

With development of a WLAN technology, a wireless device may support multi-link communication. That a wireless device supports multi-link communication means that the wireless device supports simultaneous communication on a plurality of frequency bands, or simultaneous communication on different channels of a same frequency band. The wireless device that supports the multi-link communication is usually referred to as a multi-link device (MLD). The multi-link device includes a plurality of stations (STAs).

Currently, multi-link devices in a WLAN are classified into two types: an access point (AP) multi-link device (namely, an AP MLD) and a non-access point (non-AP) multi-link device (namely, a non-AP MLD). A STA in the access point multi-link device is an AP. A STA in the non-access point multi-link device is a non-AP STA. One or more links may be set up between the non-access point multi-link device and the access point multi-link device, and each link is connected to one non-AP STA in the non-access point multi-link device and one AP in the access point multi-link device. There is an association relationship between a non-AP STA and an AP at two ends of a link.

However, because the link set up between the non-access point multi-link device and the access point multi-link device is complex, the non-access point multi-link device cannot implement roaming currently.

SUMMARY

This application provides a communication method and system in a WLAN, and an apparatus. According to the method, an access point device can provide a parameter of a neighbor access point for a non-access point device. The technical solutions are as follows.

According to a first aspect, a communication method in a WLAN is provided. The method includes: An access point device sends a first frame to a non-access point device. The first frame includes one or more groups of access point parameters. At least one group of the access point parameters includes parameters of a plurality of access points belonging to one neighbor device. The neighbor device is an access point multi-link device. The non-access point device is associated with the access point device. That at least one group of the access point parameters includes parameters of a plurality of access points belonging to one neighbor device may be understood as follows: When the first frame includes one group of access point parameters, the group of the access point parameters includes parameters of a plurality of access points belonging to one neighbor access point multi-link device; or when the first frame includes a plurality of groups of access point parameters, at least one group of the plurality of groups of the access point parameters includes parameters of a plurality of access points belonging to one neighbor access point multi-link device, and another group of the plurality of groups of the access point parameters may include only a parameter of one access point.

This application provides a solution in which the non-access point device provides a parameter of a neighbor access point for the access point device. In the first frame sent by the access point device to the non-access point device, parameters of a plurality of access points belonging to a same neighbor device are used as one group of access point parameters, so that after receiving the first frame from the access point device, the non-access point device can distinguish which neighbor access points belong to a same device.

Optionally, the access point device is an access point multi-link device.

Optionally, the non-access point device is a non-access point multi-link device.

In this application, when roaming is required, the non-access point multi-link device may select a proper roaming device based on a parameter of an access point in each neighbor device provided by the access point device and a link requirement of the non-access point multi-link device.

Optionally, the first frame further includes a first indication, and the first indication is used to indicate a type of the first frame.

Optionally, the access point device further receives a second frame from the non-access point device. The second frame is used to request to obtain a parameter of a neighbor access point of the access point device.

Optionally, the second frame further includes a second indication, and the second indication is used to indicate a type of the second frame.

Optionally, the second frame is a BTM query frame. The second frame further includes a third indication. The third indication is used to indicate that a reason why the non-access point device requests to obtain the parameter of the neighbor access point of the access point device includes: The access point device does not have a capability of receiving data and sending data respectively on different links simultaneously.

Optionally, the first frame is a neighbor report response frame or a BTM request frame.

Optionally, the first frame includes one or more neighbor report elements, and each neighbor report element includes one group of the access point parameters. If one group of the access point parameters includes parameters of a plurality of access points, a parameter of one access point in the parameters of the plurality of access points is in the neighbor report element, and a parameter of another access point is in a subelement of the neighbor report element.

Optionally, the first frame is the BTM request frame, and the access point device further receives a BTM response frame from the non-access point device.

Optionally, the parameter of the access point includes a basic service set identifier of the access point.

According to a second aspect, a communication method in a WLAN is provided. The method includes: A non-access point device receives a first frame from an access point device. The first frame includes one or more groups of access point parameters. At least one group of the access point parameters includes parameters of a plurality of access points belonging to one neighbor device. The neighbor device is an access point multi-link device. The non-access point device is associated with the access point device.

Optionally, the access point device is an access point multi-link device.

Optionally, the non-access point device is a non-access point multi-link device.

Optionally, the non-access point device parses the first frame.

Optionally, the first frame further includes a first indication, and the first indication is used to indicate a type of the first frame.

Optionally, the non-access point device sends a second frame to the access point device. The second frame is used to request to obtain a parameter of a neighbor access point of the access point device.

Optionally, the second frame further includes a second indication, and the second indication is used to indicate a type of the second frame.

Optionally, the second frame is a BTM query frame. The second frame further includes a third indication. The third indication is used to indicate that a reason why the non-access point device requests to obtain the parameter of the neighbor access point of the access point device includes: The access point device does not have a capability of receiving data and sending data respectively on different links simultaneously.

Optionally, the first frame is a neighbor report response frame or a BTM request frame.

Optionally, the first frame includes one or more neighbor report elements, and each neighbor report element includes one group of the access point parameters. If one group of the access point parameters includes parameters of a plurality of access points, a parameter of one access point in the parameters of the plurality of access points is in the neighbor report element, and a parameter of another access point is in a subelement of the neighbor report element.

Optionally, the non-access point device sends a BTM response frame to the access point device.

Optionally, the parameter of the access point includes a basic service set identifier of the access point.

According to a third aspect, an access point device is provided. The access point device includes a plurality of function modules. The plurality of function modules interact with each other, to implement the method according to the foregoing first aspect and the implementations of the first aspect. The plurality of function modules may be implemented based on software, hardware, or a combination of software and hardware, and the plurality of function modules may be randomly combined or divided based on a specific implementation.

According to a fourth aspect, a non-access point device is provided. The non-access point device includes a plurality of function modules. The plurality of function modules interact with each other, to implement the method according to the foregoing first aspect and the implementations of the first aspect. The plurality of function modules may be implemented based on software, hardware, or a combination of software and hardware, and the plurality of function modules may be randomly combined or divided based on a specific implementation.

According to a fifth aspect, an access point device is provided, including a processor and a transceiver.

The processor is configured to invoke a computer program to implement the communication method according to the first aspect in collaboration with the transceiver.

According to a sixth aspect, a non-access point device is provided, including a processor and a transceiver.

The processor is configured to invoke a computer program to implement the communication method according to the second aspect in collaboration with the transceiver.

According to a seventh aspect, a communication system in a wireless local area network is provided, including the access point device according to the third aspect or the fifth aspect, and the non-access point device according to the fourth aspect or the sixth aspect.

According to an eighth aspect, a computer storage medium is provided. The computer storage medium stores instructions. When the instructions are executed by a processor of a computer device, the method according to the foregoing first aspect and the implementations of the first aspect is implemented, or the method according to the foregoing second aspect and the implementations of the second aspect is implemented.

According to a ninth aspect, a chip is provided. The chip includes a programmable logic circuit and/or program instructions. When the chip runs, the method according to the foregoing first aspect and the implementations of the first aspect is implemented, or the method according to the foregoing second aspect and the implementations of the second aspect is implemented.

BRIEF DESCRIPTION OF THE DRAWINGS

FIG. 3 is a schematic diagram of a structure of a neighbor report request frame according to an embodiment of this application;

FIG. 4 is a schematic diagram of a structure of a neighbor report response frame according to an embodiment of this application;

FIG. 5 is a schematic diagram of a structure of a neighbor report element field according to an embodiment of this application;

FIG. 9 is a schematic diagram of a structure of a BTM request frame according to an embodiment of this application;

FIG. 10 is a schematic diagram of a structure of a BTM response frame according to an embodiment of this application;

FIG. 11 is a schematic diagram of a structure of an access point device according to an embodiment of this application;

FIG. 12 is a schematic diagram of a structure of another access point device according to an embodiment of this application;

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Embodiments of this application are applied to a WLAN, and the WLAN includes at least two access point devices and at least one non-access point device. The at least two access point devices include at least one access point multi-link device. The at least one non-access point device may include a non-access point multi-link device.

The access point multi-link device includes a plurality of APs, and the non-access point multi-link device includes a plurality of non-AP STAs. One or more links may be set up between the non-access point multi-link device and the access point multi-link device, and each link is connected to one non-AP STA in the non-access point multi-link device and one AP in the access point multi-link device. A non-AP STA and an AP at two ends of a link are associated. The plurality of APs in the access point multi-link device work independently. For example, some APs work, and the other APs sleep. The plurality of non-AP STAs in the non-access point multi-link device work independently. For example, some non-AP STAs work, and the other non-AP STAs sleep.

Figure 1:
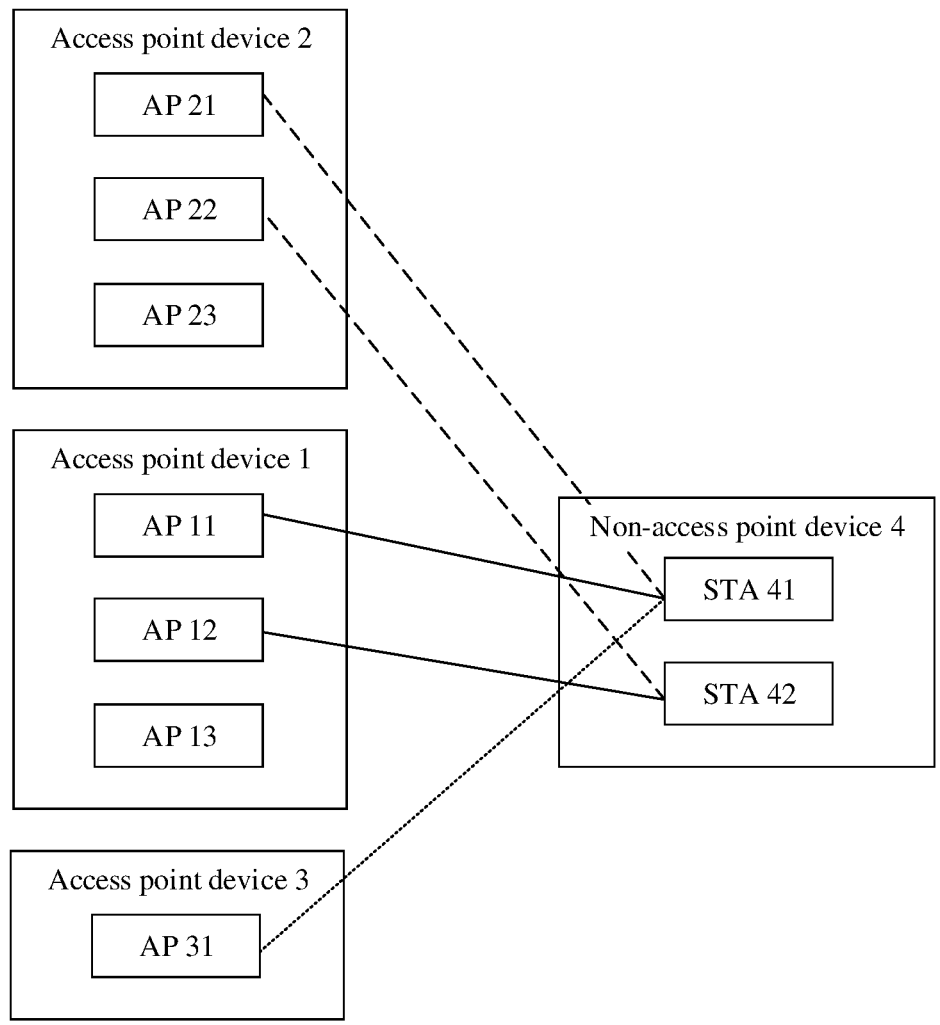
FIG. 1 is a schematic diagram of a structure of a WLAN according to an embodiment of this application.

Optionally, FIG. 1 is a schematic diagram of a structure of a WLAN according to an embodiment of this application. As shown in FIG. 1, the WLAN includes three access point devices: access point devices 1 to 3, and a non-access point device 4. The non-access point device 4 is associated with the access point device 1. That the non-access point device 4 is associated with the access point device 1 means that at least one non-AP STA in the non-access point device 4 is associated with at least one AP in the access point device 1, that is, there is at least one link between the non-access point device 4 and the access point device 1.

The access point device 1 may be an access point multi-link device, or may not be an access point multi-link device (that is, includes only one AP). The non-access point device 4 may be a non-access point multi-link device, or may not be a non-access point multi-link device (that is, includes only one non-AP STA). A neighbor device of the access point device 1 includes at least one access point multi-link device. A neighbor device of an access point device refers to a device near the access point device. For example, if strength of a signal received by the access point device from a device is greater than a signal strength threshold, the device is the neighbor device. For another example, there is a possible roaming relationship between the access point device and the device (for example, two access point devices are respectively disposed in two adjacent rooms, and although a wall blocks signal transmission between the two access point devices, when a non-access point device moves from one room to the other room, roaming occurs between the two access point devices, that is, there is the roaming relationship between the two access point devices), and the device is the neighbor device. For another example, planning personnel manually configure information about the neighbor device in the access point device.

For example, as shown in FIG. 1, the access point device 1 is an access point multi-link device. The non-access point device 4 is a non-access point multi-link device. The neighbor device of the access point device 1 includes the access point device 2 and the access point device 3. The access point device 2 is an access point multi-link device, and the access point device 3 is not an access point multi-link device. The WLAN shown in FIG. 1 is merely used as an example for description, and is not intended to limit the WLAN provided in this embodiment of this application. For example, the neighbor device of the access point device 1 includes a plurality of access point multi-link devices.

Optionally, the plurality of APs in the access point multi-link device respectively support different frequency bands or different channels of a same frequency band. The plurality of non-AP STAs in the non-access point multi-link device respectively support different frequency bands or different channels of a same frequency band. An AP and a non-AP STA that are associated with each other support a same frequency band, and a link between the AP and the non-AP STA is set up on the frequency band supported by the AP and the non-AP STA.

Optionally, the frequency band supported by the AP and the non-AP STA may be a 2.4 GHz frequency band, a 3.6 GHz frequency band, a 4.9 GHz frequency band, a 5 GHz frequency band, a 6 GHz frequency band, or a 60 GHz frequency band.

Still as shown in FIG. 1, the access point device 1 includes an AP 11, an AP 12, and an AP 13, the access point device 2 includes an AP 21, an AP 22, and an AP 23, the access point device 3 includes an AP 31, and the non-access point device 4 includes a STA 41 and a STA 42. The STA 41 and the STA 42 both are non-AP STAs. The AP 11, the AP 12, and the AP 13 in the access point device 1 respectively support the 2.4 GHz frequency band, the 5 GHz frequency band, and the 6 GHz frequency band. The AP 21, the AP 22, and the AP 23 in the access point device 2 respectively support the 2.4 GHz frequency band, the 5 GHz frequency band, and the 60 GHz frequency band. The AP 31 in the access point device 3 supports the 2.4 GHz frequency band. The STA 41 and the STA 42 in the non-access point device 4 respectively support the 2.4 GHz frequency band and the 5 GHz frequency band. In FIG. 1, a solid line represents a link that has been set up between the access point device 1 and the non-access point device 4, and two kinds of dashed lines respectively represent links (which actually do not exist) that may be set up between the non-access point device 4 and the access point device 2 and a link (which actually does not exist) that may be established between the non-access point device 4 and the access point device 3.

As shown in FIG. 1, the non-access point device 4 is associated with the access point device 1. There are two links between the non-access point device 4 and the access point device 1. One link connects the AP 11 in the access point device 1 to the STA 41 in the non-access point device 4, and the other link connects the AP 12 in the access point device 1 to the STA 42 in the non-access point device 4. To be specific, the AP 11 is associated with the STA 41, and the AP 12 is associated with the STA 42. The link between the AP 11 and the STA 41 is set up on the 2.4 GHz frequency band, and the link between the AP 12 and the STA 42 is set up on the 5 GHz frequency band.

In a movement process of the non-access point device in the WLAN, quality of a link decreases as a distance between the non-access point device and an associated access point device increases, an obstacle appears, and/or the like. Alternatively, when the associated access point device does not have a capability of receiving data and sending data respectively on different links simultaneously, roaming of the non-access point device may be triggered, and the non-access point device roams to an access point device that provides a link with higher quality, to meet a requirement of a service on communication quality.

When the non-access point device roams, the non-access point device needs to disconnect all links between the non-access point device and an original associated access point device, and then re-associate with a roaming device, that is, re-sets up a link between a non-AP STA associated with the original associated access point device and a corresponding AP in the roaming device. Before the non-access point device roams, the original associated access point device provides a parameter of a neighbor access point for the non-access point device, so that the non-access point device determines the roaming device. However, currently, the access point device provides a parameter of a single access point for the non-access point device. When the neighbor device of the access point device includes an access point multi-link device, the non-access point device cannot distinguish, based on only the parameter of the access point, which access points belong to a same device. Therefore, currently, the non-access point device cannot select a proper access point device to roam, and roaming cannot be implemented.

For example, in the WLAN shown in FIG. 1, the access point device 1 provides parameters of the AP 21, the AP 22, the AP 23, and the AP 31 for the non-access point device 4. The non-access point device 4 sets up the links with the access point device 1 on the 2.4 GHz frequency band and the 5 GHz frequency band respectively. When the non-access point device 4 roams, the non-access point device 4 usually needs to re-set up links with a roaming device on the 2.4 GHz frequency band and the 5 GHz frequency band respectively. However, the non-access point device 4 can only determine, based on the parameters that are of the access points and that are provided by the access point device 1, that the AP 21 and the AP 31 support the 2.4 GHz frequency band, the AP 22 supports the 5 GHz frequency band, and the AP 23 supports the 60 GHz frequency band, but cannot know which APs in the APs supporting the 2.4 GHz frequency band and the APs supporting the 5 GHz frequency band belong to a same device. When the non-access point device 4 selects to set up a link with the AP 31 on the 2.4 GHz frequency band, that is, the non-access point device 4 roams to the access point device 3, the non-access point device 4 cannot set up a link on the 5 GHz frequency band, resulting in a roaming failure of the non-access point device 4.

Alternatively, only one link can be set up between the non-access point multi-link device and a currently associated access point device. When the non-access point multi-link device wants to roam to another access point device to set up a plurality of links, currently, which access point device can meet a requirement cannot be determined, and roaming cannot be implemented.

An embodiment of this application provides a communication method in a WLAN. An access point device sends a first frame to a non-access point device. The first frame includes one or more groups of access point parameters. At least one group of the access point parameters includes parameters of a plurality of access points belonging to one neighbor device, and the neighbor device is an access point multi-link device. The access point device is associated with the non-access point device. That at least one group of the access point parameters includes parameters of a plurality of access points belonging to one neighbor device may be understood as follows: When the first frame includes one group of access point parameters, the group of the access point parameters includes parameters of a plurality of access points belonging to one neighbor access point multi-link device; or when the first frame includes a plurality of groups of access point parameters, at least one group of the plurality of groups of the access point parameters includes parameters of a plurality of access points belonging to one neighbor access point multi-link device, and another group of the plurality of groups of the access point parameters may include only a parameter of one access point.

After receiving the first frame from the access point device, the non-access point device parses the first frame, to obtain a parameter of a neighbor access point of the access point device.

For example, in the WLAN shown in FIG. 1, the first frame sent by the access point device 1 to the non-access point device 4 includes two groups of access point parameters, one group of the access point parameters includes parameters of the AP 21, the AP 22, and the AP 23 that belong to the access point device 2, and the other group of the access point parameters includes a parameter of the AP 31 that belongs to the access point device 3.

This embodiment of this application provides the method in which the non-access point device provides the parameter of the neighbor access point for the access point device. In the first frame sent by the access point device to the non-access point device, parameters of a plurality of access points belonging to a same neighbor device are used as one group of access point parameters, so that after receiving the first frame from the access point device, the non-access point device can distinguish which neighbor access points belong to a same device. Further, the non-access point device may select a proper roaming device based on parameters of access points in the neighbor device, for example, select a roaming device based on a quantity of the access points in the neighbor device, to implement roaming of the non-access point device.

Optionally, the access point device is an access point multi-link device. The non-access point device is a non-access point multi-link device. In this embodiment of this application, for the access point device and the non-access point device that are associated, the access point device is an access point multi-link device, and the non-access point device is a non-access point multi-link device. Alternatively, the access point device is an access point multi-link device, and the non-access point device is not a non-access point multi-link device. Alternatively, the access point device is not an access point multi-link device, and the non-access point device is a non-access point multi-link device. Alternatively, the access point device is not an access point multi-link device, and the non-access point device is not a non-access point multi-link device. This embodiment of this application is described by using an example in which the access point device is the access point multi-link device and the non-access point device is the non-access point multi-link device.

For example, in the WLAN shown in FIG. 1, the access point device 1 is an access point multi-link device, and the non-access point device 4 is a non-access point multi-link device. When the non-access point device 4 needs to roam to an access point device that can meet a requirement for separately setting up a link on the 2.4 GHz frequency band and the 5 GHz frequency band, the non-access point device 4 determines, based on two groups of access point parameters provided by the access point device 1, that the AP 21 and the AP 22 belong to one device and the AP 31 belongs to another device, and then selects to set up a link with the AP 21 on the 2.4 GHz frequency band and set up a link with the AP 22 on the 5 GHz frequency band, that is, the non-access point device 4 roams to the access point device 2.

In this embodiment of this application, when roaming is required, the non-access point multi-link device can determine, based on a plurality of groups of access point parameters provided by the access point device, which access points belong to a same device, and then select a proper roaming device and a link requirement of the non-access point multi-link device. For example, if two neighbor devices have similar signal quality, the non-access point multi-link device preferably roams to the neighbor device with a plurality of APs.

Optionally, the first frame further includes a first indication, and the first indication is used to indicate a type of the first frame.

Optionally, the first frame is a neighbor report response frame. Alternatively, the first frame is a basic service set (BSS) transition management (BTM) request frame. Alternatively, the first frame is a beacon frame, a probe response frame, or another frame that can carry a parameter of an access point.

Optionally, the first frame includes one or more neighbor report elements, and each neighbor report element includes one group of the access point parameters. If one group of the access point parameters includes parameters of a plurality of access points, a parameter of one access point in the parameters of the plurality of access points is in the neighbor report element, and a parameter of another access point is in a subelement of the neighbor report element. Optionally, the subelement is named a Co-MLD neighbor report subelement, a neighbor report subelement, or a multi-link neighbor report subelement. In this embodiment of this application, a subelement that is in the neighbor report element and that is used to store a parameter of an access point is referred to as a neighbor report subelement.

Optionally, subelement content that is not carried in the parameter of the access point in the subelement of the neighbor report element inherits corresponding subelement content in the parameter of the access point in the neighbor report element.

Optionally, before the access point device sends the first frame to the non-access point device, the access point device receives a second frame from the non-access point device. The second frame is used to request to obtain a parameter of a neighbor access point of the access point device. The access point device sends the first frame to the non-access point device based on the second frame. When the first frame is a neighbor report response frame, the second frame is a neighbor report request frame. When the first frame is a BTM request frame, the second frame is a BTM query frame.

Optionally, the second frame further includes a second indication, and the second indication is used to indicate a type of the second frame.

Optionally, when the second frame is the BTM query frame, the second frame further includes a third indication. The third indication is used to indicate that a reason why the non-access point device requests to obtain the parameter of the neighbor access point of the access point device includes: The access point device does not have a capability of receiving data and sending data respectively on different links simultaneously. There are a plurality of links between the non-access point device and the access point device. That the access point device does not have a capability of receiving data and sending data respectively on different links simultaneously means that the access point device does not have a capability of receiving data on one link and sending data on another link simultaneously. In this embodiment of this application, such an access point device is referred to as an access point device that does not have a simultaneous transmit and receive (STR) capability. Difference between an STR capability of the access point device and an STR capability during association may be caused by switching a channel of one or more links of the access point device.

Optionally, when the first frame is the BTM request frame, after the access point device sends the first frame to the non-access point device, the access point device further receives a BTM response frame from the non-access point device.

Optionally, the BTM response frame further includes a fourth indication, and the fourth indication is used to indicate a type of the BTM response frame.

Optionally, the parameter of the access point includes a BSS identifier (ID) of the access point. The parameter of the access point also includes BSSID information, an operating class, a channel number, a physical type (PHY type), and optional subelements. The subelements include a compressed country string (condensed country string), basic service set transition candidate preference (BSS transition candidate preference), a measurement report, a high throughput (HT) capability, or the like. For a type and a function of the subelement, refer to descriptions about a neighbor report in the institute of electrical and electronics engineers (IEEE) 802.11 protocol. Details are not described in this embodiment of this application again.

This application describes an implementation process of the communication method in the WLAN by using an example in which the first frame is the neighbor report response frame and the BTM request frame.

Figure 2:
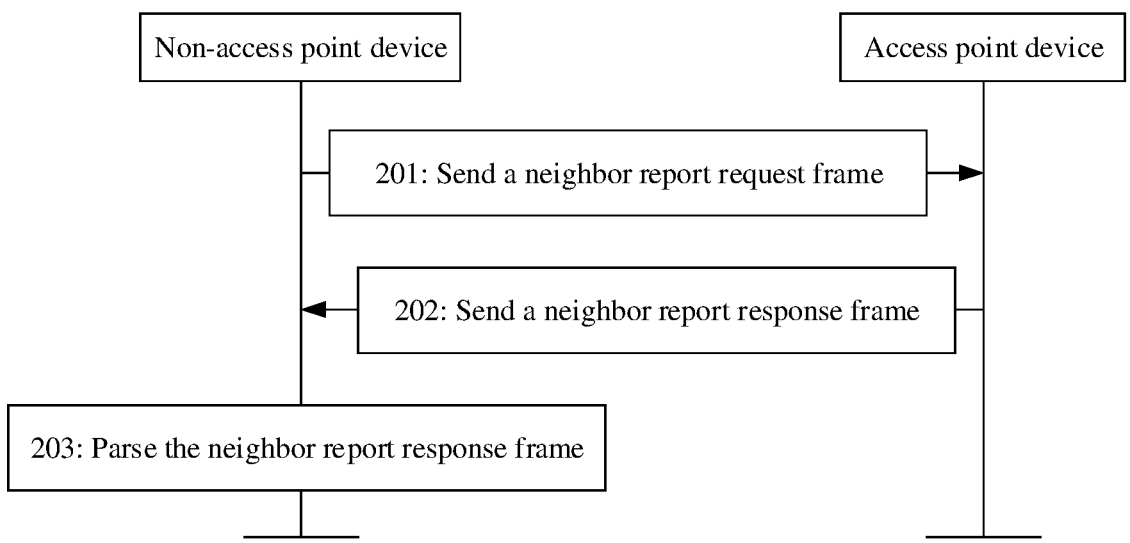
FIG. 2 is a schematic flowchart of a communication method in a WLAN according to an embodiment of this application.

In an optional embodiment, the first frame is the neighbor report response frame. FIG. 2 is a schematic flowchart of a communication method in a WLAN according to an embodiment of this application. The method may be applied to the WLAN shown in FIG. 1. As shown in FIG. 2, the method includes the following steps.

Step 201: A non-access point device sends a neighbor report request frame to an access point device.

Optionally, FIG. 3 is a schematic diagram of a structure of the neighbor report request frame according to this embodiment of this application. As shown in FIG. 3, the neighbor report request frame includes a category field, a radio measurement action field, a dialog token field, a service set identifier (SSID) field (optional), a location configuration information measurement request (LCI measurement request) field (optional), and a location civic measurement request field (optional). Lengths of the category field, the radio measurement action field, and the dialog token field are all 1 byte. Lengths of the SSID field, the location configuration information measurement request field, and the location civic measurement request are variable.

Optionally, the neighbor report request frame includes a second indication, and the second indication is used to indicate a frame type. In this embodiment of this application, the frame type may be indicated by using a value of the radio measurement action field. Optionally, a value range of the radio measurement action field is 6 to 255, and a corresponding indicated frame type is a multi-link neighbor report request frame or a multi-link device neighbor report request (MLD neighbor report request) frame.

Alternatively, the neighbor report request frame may not include the second indication. Because the non-access point device is associated with the access point device, after receiving the neighbor report request frame, the access point device may determine, by the access point device, whether the non-access point device sending the neighbor report request frame is a non-access point multi-link device.

Step 202: The access point device sends a neighbor report response frame to the non-access point device.

Optionally, FIG. 4 is a schematic diagram of a structure of the neighbor report response frame according to this embodiment of this application. As shown in FIG. 4, the neighbor report response frame includes a category field, a radio measurement action field, a dialog token field, and a neighbor report element field (optional). Lengths of the category field, the radio measurement action field, and the dialog token field are all 1 byte. A length of the neighbor report element field is variable.

Optionally, the neighbor report response frame includes a first indication, and the first indication is used to indicate a frame type. In this embodiment of this application, the frame type may be indicated by using a value of the radio measurement action field. Optionally, a value range of the radio measurement action field is 6 to 255, and a corresponding indicated frame type is a multi-link neighbor report response frame or a multi-link device neighbor report response (MLD neighbor report response) frame. The first indication is different from the second indication.

Optionally, the neighbor report element field includes one or more neighbor report elements, and each neighbor report element includes one group of access point parameters. For example, in the WLAN shown in FIG. 1, the access point device 1 uses the parameter of the AP 21, the parameter of the AP 22, and the parameter of the AP 23 as one group of access point parameters, and uses the parameter of the AP 31 as another group of access point parameters. In this case, the neighbor report response frame sent by the access point device 1 to the non-access point device 4 includes two neighbor report elements.

FIG. 5 is a schematic diagram of a structure of the neighbor report element field according to this embodiment of this application. As shown in FIG. 5, the neighbor report element field includes an element identifier (element ID) field, a length field, a BSSID field, a BSSID information field, an operating class field, a channel number field, a physical type field, and a subelement field (optional). A length of the element identifier field is 1 byte. A length of the length field is 1 byte. A length of the BSSID field is 6 bytes. A length of the BSSID information field is 4 bytes. A length of the operating class field is 1 byte. A length of the channel number field is 1 byte. A length of the physical type field is 1 byte. A length of the subelement field is variable.

If one group of the access point parameters includes parameters of a plurality of access points, a parameter of one access point in the parameters of the plurality of access points is in the neighbor report element, and a parameter of another access point is in a subelement of the neighbor report element. For example, the group of access point parameters corresponding to the access point device 2 includes the parameter of the AP 21, the parameter of the AP 22, and the parameter of the AP 23.

Figure 6:
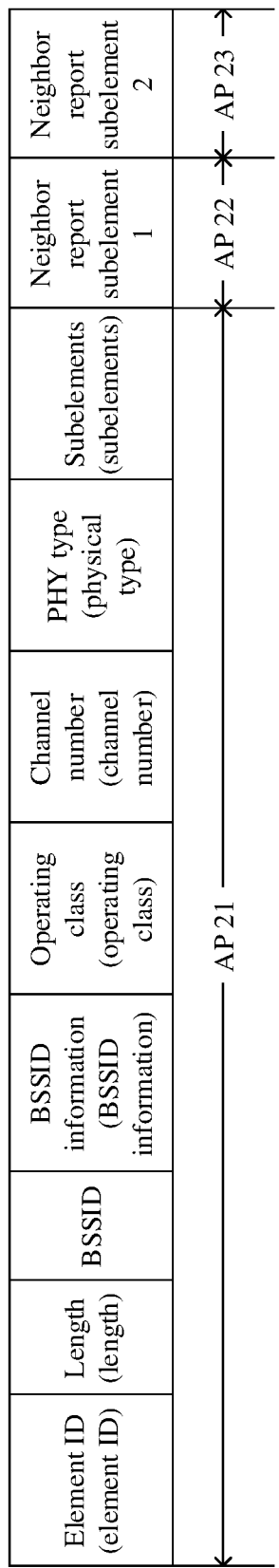
FIG. 6 is a schematic diagram of a structure of a neighbor report element including a plurality of groups of access point parameters according to an embodiment of this application.

For example, FIG. 6 is a schematic diagram of a structure of a neighbor report element including a plurality of groups of access point parameters according to this embodiment of this application. As shown in FIG. 6, the neighbor report element includes parameters of a plurality of access points belonging to the access point device 2. The parameter of the AP 21 is in the neighbor report element, the parameter of the AP 22 is in a neighbor report subelement 1 of the neighbor report element, and the parameter of the AP 23 is in a neighbor report subelement 2 of the neighbor report element. For a structure of the neighbor report subelement 1 and a structure of the neighbor report subelement 2, refer to the structure of the neighbor report element shown in FIG. 5. The element identifier is replaced with a neighbor report subelement identifier.

Optionally, a subelement that is not carried in a parameter of an access point in the neighbor report subelement may inherit a corresponding subelement in the parameter of the access point in the neighbor report element. For example, in the neighbor report element shown in FIG. 6, if the parameter of the AP 22 does not include an HT capability, an HT capability of the AP 21 may be used as an HT capability of the AP 22.

In this embodiment of this application, for a plurality of access points belonging to a same access point device, a parameter of a target access point that includes a largest quantity of subelements may be placed in a neighbor report element, a parameter of another access point is placed in a neighbor report subelement, and a subelement that is in the parameter of the another access point and that is the same as a subelement in the parameter of the target access point may not be carried, and is obtained in an inheritance manner, to reduce network overheads.

Step 203: The non-access point device parses the neighbor report response frame.

The non-access point device obtains a parameter of an access point in a neighbor device of the access point device by parsing the neighbor report response frame. Optionally, the non-access point device determines, based on parameters of all access points in different neighbor devices, a roaming device in the neighbor devices. For example, in the WLAN shown in FIG. 1, the non-access point device 4 may determine to roam to the access point device 2, and separately re-set up links on the 2.4 GHz frequency band and the 5 GHz frequency band.

Optionally, for functions of the neighbor report request frame and the neighbor report response frame provided in this embodiment of this application and meanings and functions of the fields in the neighbor report request frame and the neighbor report response frame, refer to related explanations in IEEE 802.11k. Details are not described in this embodiment of this application again.

Figures 7, 8:
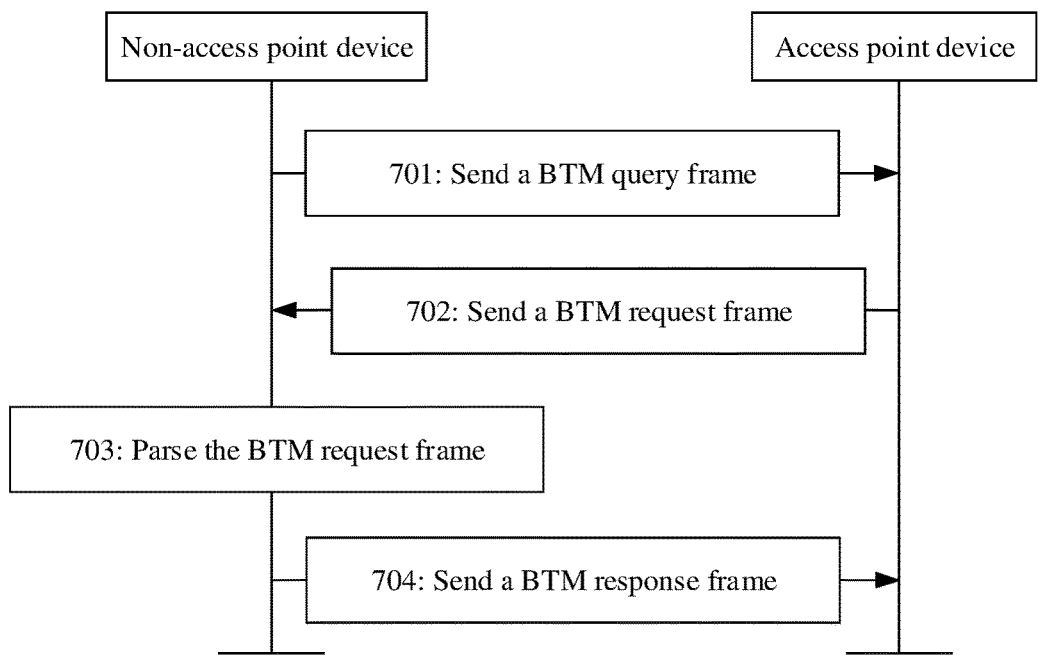
FIG. 7 is a schematic flowchart of another communication method in a WLAN according to an embodiment of this application.
FIG. 8 is a schematic diagram of a structure of a BTM query frame according to an embodiment of this application.

In another optional embodiment, the first frame is the BTM request frame. FIG. 7 is a schematic flowchart of another communication method in a WLAN according to an embodiment of this application. The method may be applied to the WLAN shown in FIG. 1. As shown in FIG. 7, the method includes the following steps.

Step 701: A non-access point device sends a BTM query frame to an access point device.

Optionally, FIG. 8 is a schematic diagram of a structure of the BTM query frame according to this embodiment of this application. As shown in FIG. 8, the BTM query frame includes a category field, a wireless network management (WNM) action field, a dialog token field, a BSS transition query reason field, and a BSS transition candidate list entry field (optional). Lengths of the category field, the WNM action field, the dialog token field, and the BSS transition query reason field are 1 byte. A length of the BSS transition candidate list entry field is variable.

Optionally, the BTM query frame includes a second indication, and the second indication is used to indicate a frame type. In this embodiment of this application, the frame type may be indicated by using a value of the WNM action field. Optionally, a value range of the WNM action field is 29 to 255, and a corresponding indicated frame type is a multi-link BTM query frame or a multi-link device BTM query frame.

Alternatively, the BTM query frame may not include the second indication. Because the non-access point device is associated with the access point device, after receiving the BTM query frame, the access point device may determine, by the access point device, whether the non-access point device sending the BTM query frame is a non-access point multi-link device.

Optionally, the BTM query frame further includes a third indication, and the third indication is used to indicate a specific reason why the non-access point device requests to obtain a parameter of a neighbor access point of the access point device (which is referred to as a query reason for short). In this embodiment of this application, the query reason may be indicated by using a value of the BSS transition query reason field. Optionally, a value range of the BSS transition query reason field is 21 to 255, and an indicated query reason is that the access point device is non-STR.

Step 702: The access point device sends the BTM request frame to the non-access point device.

Optionally, the access point device sends the BTM request frame to the non-access point device based on the BTM query frame from the non-access point device. Alternatively, the access point device actively sends the BTM request frame to the non-access point device, that is, Step 701 is not performed and Step 702 is directly performed.

Optionally, FIG. 9 is a schematic diagram of a structure of the BTM request frame according to this embodiment of this application. As shown in FIG. 9, the BTM request frame includes a category field, a WNM action field, a dialog token field, a request mode (request mode) field, a disassociation timer field, a validity interval field, a BSS termination duration field (optional), a dialog information universal resource locator (URL) (optional), and a BSS transition candidate list entry field (optional). Lengths of the category field, the WNM action field, the dialog token field, the request mode field, and the validity interval field are 1 byte. A length of the disassociation timer field is 2 bytes. A length of the BSS termination duration field is 0 or 12 bytes. Lengths of the dialog information universal resource locator and the BSS transition candidate list entry field are variable.

Optionally, the BTM request frame includes a first indication, and the first indication is used to indicate a frame type. In this embodiment of this application, the frame type may be indicated by using a value of the WNM action field. Optionally, a value range of the WNM action field is 29 to 255, and a corresponding indicated frame type is a multi-link BTM request frame or a multi-link device BTM request frame.

Optionally, the BSS transition candidate list entry field includes one or more neighbor report elements, and each neighbor report element includes one group of access point parameters. For a manner of storing one group of access point parameters in one neighbor report element, refer to related descriptions in the foregoing Step 202. Details are not described in this embodiment of this application again. When the BSS transition candidate list entry field includes one neighbor report element, the BTM request frame is used to indicate the non-access point device to roam to an access point device corresponding to the neighbor report element. When the BSS transition candidate list entry field includes a plurality of neighbor report elements, the BTM request frame is used to provide a plurality of optional access point devices for roaming to a non-access point device.

Step 703: The non-access point device parses the BTM request frame.

The non-access point device obtains a parameter of an access point in a neighbor device of the access point device by parsing the BTM frame. Optionally, the non-access point device determines, based on parameters of all access points in different neighbor devices, a roaming device in the neighbor devices. For example, in the WLAN shown in FIG. 1, the non-access point device 4 may determine to roam to the access point device 2, and separately re-set up links on the 2.4 GHz frequency band and the 5 GHz frequency band.

Step 704: The non-access point device sends a BTM response frame to the access point device.

Optionally, FIG. 10 is a schematic diagram of a structure of the BTM response frame according to this embodiment of this application. As shown in FIG. 10, the BTM response frame includes a category field, a WNM action field, a dialog token field, a BTM status code field, a BSS termination delay field, a target BSSID field (optional), and a BSS transition candidate list entry field (optional). Lengths of the category field, the WNM action field, the dialog token field, the BTM status code field, and the BSS termination delay field are 1 byte. A length of the target BSSID field is 0 or 6 bytes. A length of the BSS transition candidate list entry field is variable.

Optionally, the BTM response frame includes a fourth indication, and the fourth indication is used to indicate a frame type. In this embodiment of this application, the frame type may be indicated by using a value of the WNM action field. Optionally, a value range of the WNM action field is 29 to 255, and a corresponding indicated frame type is a multi-link BTM response frame or a multi-link device BTM response frame. The first indication, the second indication, and the fourth indication are all different.

Optionally, the BSS transition candidate list entry field of the BTM response frame includes one or more neighbor report elements, and each neighbor report element includes one group of access point parameters. For a manner of storing one group of access point parameters in one neighbor report element, refer to related descriptions in the foregoing Step 202. Details are not described in this embodiment of this application again. The access point parameter carried in the BTM response frame is used to reflect roaming preference of the non-access point device.

Optionally, for functions of the BTM query frame, the BTM request frame, and the BTM response frame that are provided in this embodiment of this application, and meanings and functions of the fields in the BTM query frame, the BTM request frame, and the BTM response frame, refer to related explanations in IEEE 802.11v. Details are not described herein again in this embodiment of this application.

A sequence of the steps of the communication method in the WLAN provided in this embodiment of this application may be properly adjusted, or the steps may be correspondingly added or deleted based on a situation. For example, the foregoing Step 701 and Step 704 may not be performed. Any variation method readily figured out by a person skilled in the art within the technical scope disclosed in this application shall fall within the protection scope of this application. Therefore, details are not described herein.

In conclusion, this embodiment of this application provides the method in which the non-access point device provides the parameter of the neighbor access point for the access point device. In the first frame sent by the access point device to the non-access point device, parameters of a plurality of access points belonging to a same neighbor device are used as one group of access point parameters, so that after receiving the first frame from the access point device, the non-access point device can distinguish which neighbor access points belong to a same device. Further, the non-access point device may select a proper roaming device based on parameters of access points in the neighbor device, for example, select a roaming device based on a quantity of the access points in the neighbor device, to implement roaming of the non-access point device. When needing to roam, the non-access point multi-link device can determine, based on a plurality of groups of access point parameters provided by the access point device, which access points belong to a same device, and then select a proper roaming device with reference to a link requirement of the non-access point multi-link device.

FIG. 11 is a schematic diagram of a structure of an access point device according to an embodiment of this application. The access point device may be the access point device 1 in the WLAN shown in FIG. 1. As shown in FIG. 11, the access point device 110 includes:

a sending module 1101, configured to send a first frame to a non-access point device, where the first frame includes one or more groups of access point parameters. At least one group of the access point parameters includes parameters of a plurality of access points belonging to one neighbor device, the neighbor device is an access point multi-link device, and the non-access point device is associated with the access point device.

Optionally, the access point device is an access point multi-link device.

Optionally, the non-access point device is a non-access point multi-link device.

Optionally, as shown in FIG. 12, the access point device further includes a generation module 1102 and/or a receiving module 1103.

Optionally, the generation module 1102 is configured to generate the first frame.

Optionally, the first frame further includes a first indication, and the first indication is used to indicate a type of the first frame.

Optionally, the receiving module 1103 is configured to receive a second frame from the non-access point device. The second frame is used to request to obtain a parameter of a neighbor access point of the access point device.

Optionally, the second frame further includes a second indication, and the second indication is used to indicate a type of the second frame.

Optionally, the second frame is a BTM query frame. The second frame further includes a third indication. The third indication is used to indicate that a reason why the non-access point device requests to obtain the parameter of the neighbor access point of the access point device includes: The access point device does not have a capability of receiving data and sending data respectively on different links simultaneously.

Optionally, the first frame is a neighbor report response frame or a BTM request frame.

Optionally, the first frame includes one or more neighbor report elements, and each neighbor report element includes one group of the access point parameters. If one group of the access point parameters includes parameters of a plurality of access points, a parameter of one access point in the parameters of the plurality of access points is in the neighbor report element, and a parameter of another access point is in a subelement of the neighbor report element.

Optionally, the first frame is the BTM request frame, and the receiving module 1103 is further configured to receive a BTM response frame from the non-access point device.

Optionally, the parameter of the access point includes a basic service set identifier of the access point.

In conclusion, in this embodiment of this application, in the first frame sent by the access point device to the non-access point device, parameters of a plurality of access points belonging to a same neighbor device are used as one group of access point parameters, so that after receiving the first frame from the access point device, the non-access point device can distinguish which neighbor access points belong to a same device. Further, the non-access point device may select a proper roaming device based on parameters of access points in the neighbor device, for example, select a roaming device based on a quantity of the access points in the neighbor device, to implement roaming of the non-access point device. When needing to roam, the non-access point multi-link device can determine, based on a plurality of groups of access point parameters provided by the access point device, which access points belong to a same device, and then select a proper roaming device with reference to a link requirement of the non-access point multi-link device.

Figure 13:
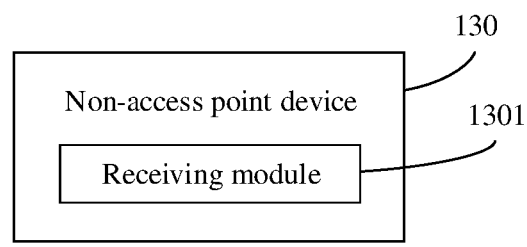
FIG. 13 is a schematic diagram of a structure of a non-access point device according to an embodiment of this application.

FIG. 13 is a schematic diagram of a structure of a non-access point device according to an embodiment of this application. The non-access point device may be the non-access point device 4 in the WLAN shown in FIG. 1. The non-access point device 130 includes:

a receiving module 1301, configured to receive a first frame from an access point device, where the first frame includes one or more groups of access point parameters. At least one group of the access point parameters includes parameters of a plurality of access points belonging to one neighbor device, the neighbor device is an access point multi-link device, and the non-access point device is associated with the access point device.

Optionally, the access point device is an access point multi-link device.

Optionally, the non-access point device is a non-access point multi-link device.

Figure 14:
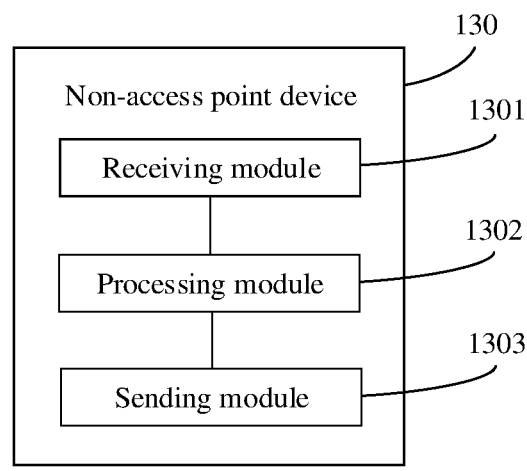
FIG. 14 is a schematic diagram of a structure of another non-access point device according to an embodiment of this application.

Optionally, as shown in FIG. 14, the non-access point device 130 further includes a processing module 1302 and/or a sending module 1303.

Optionally, the processing module 1302 is configured to parse the first frame.

Optionally, the first frame further includes a first indication, and the first indication is used to indicate a type of the first frame.

Optionally, the sending module 1303 is configured to send a second frame to the access point device. The second frame is used to request to obtain a parameter of a neighbor access point of the access point device.

Optionally, the second frame further includes a second indication, and the second indication is used to indicate a type of the second frame.

Optionally, the second frame is a BTM query frame. The second frame further includes a third indication. The third indication is used to indicate that a reason why the non-access point device requests to obtain the parameter of the neighbor access point of the access point device includes: The access point device does not have a capability of receiving data and sending data respectively on different links simultaneously.

Optionally, the first frame is a neighbor report response frame or a BTM request frame.

Optionally, the first frame includes one or more neighbor report elements, and each neighbor report element includes one group of the access point parameters. If one group of the access point parameters includes parameters of a plurality of access points, a parameter of one access point in the parameters of the plurality of access points is in the neighbor report element, and a parameter of another access point is in a subelement of the neighbor report element.

Optionally, the sending module 1303 is further configured to send a BTM response frame to the access point device.

Optionally, the parameter of the access point includes a basic service set identifier of the access point.

In conclusion, in this embodiment of this application, in the first frame sent by the access point device to the non-access point device, parameters of a plurality of access points belonging to a same neighbor device are used as one group of access point parameters, so that after receiving the first frame from the access point device, the non-access point device can distinguish which neighbor access points belong to a same device. Further, the non-access point device may select a proper roaming device based on parameters of access points in the neighbor device, for example, select a roaming device based on a quantity of the access points in the neighbor device, to implement roaming of the non-access point device. When needing to roam, the non-access point multi-link device can determine, based on a plurality of groups of access point parameters provided by the access point device, which access points belong to a same device, and then select a proper roaming device with reference to a link requirement of the non-access point multi-link device.

For the apparatus in the foregoing embodiment, a specific manner of performing an operation by each module is described in detail in the embodiment related to the method, and details are not described herein again.

An embodiment of this application provides an access point device, including a processor and a transceiver.

The processor is configured to invoke a computer program to implement the actions performed by the access point device in the foregoing method embodiments in collaboration with the transceiver.

Figure 15:
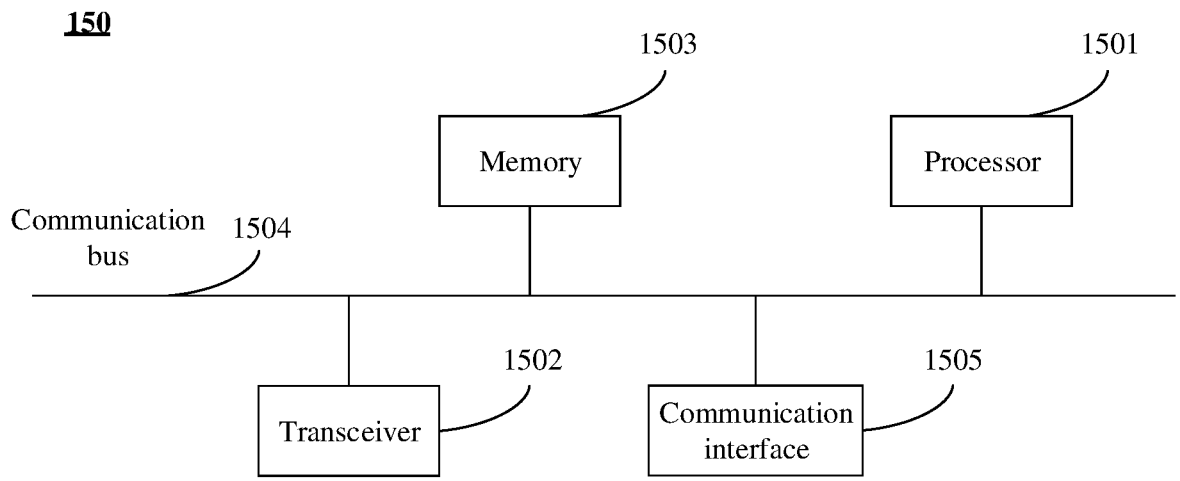
FIG. 15 is a block diagram of an access point device according to an embodiment of this application.

For example, FIG. 15 is a block diagram of the access point device according to this embodiment of this application. As shown in FIG. 15, the access point device 150 includes a processor 1501 and a transceiver 1502. The transceiver 1502 is configured to perform, under the control of the processor 1501, receiving and sending actions of the access point device in the foregoing method embodiments.

Optionally, the access point device 150 further includes a memory 1503, a communication bus 1504, and a communication interface 1505.

The processor 1501 may be a general-purpose central processing unit (CPU), an application-specific integrated circuit (ASIC), or one or more integrated circuits configured to control program execution of the solutions of this application.

The communication bus 1504 may include a path for transmitting information between the foregoing components.

The memory 1503 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk or another magnetic storage device, or any other medium that can be used to carry or store expected program code in a form of instructions or a data structure and that can be accessed by a computer. However, this is not limited thereto. The memory 1503 may exist independently, or may be connected to the processor 1501 through the communication bus 1504. Alternatively, the memory 1503 may be integrated with the processor 1501.

The memory 1503 is configured to store program code for executing the solutions of this application, and the processor 1501 controls execution. The processor 1501 is configured to execute the program code stored in the memory 1503. The program code may include one or more software modules. The one or more software modules may be the software module provided in any embodiment in FIG. 11 or FIG. 12.

The communication interface 1505 uses the transceiver 1502 and is configured to communicate with another device or a communication network, for example, an Ethernet, a radio access network (RAN), or a WLAN.

During specific implementation, in an embodiment, the access point device may include a plurality of processors. Each of the processors may be a single-core processor, or may be a multi-core processor. The processor herein may be one or more devices, circuits, and/or processing cores configured to process data (for example, computer program instructions).

During specific implementation, the access point device may be a router, a switch, or the like.

Optionally, the access point device is an access point multi-link device. A plurality of APs included in the access point multi-link device are independent of each other at a low MAC layer and a PHY layer, and are also independent of each other at a high MAC layer. Alternatively, a plurality of STAs included in the access point multi-link device are independent of each other at a low MAC layer and a PHY layer, and share a high MAC layer. An internal structure of the access point multi-link device is not limited in this embodiment of this application. For example, the high MAC layer or the low MAC layer may be implemented by one processor in a chip system of the access point multi-link device, or may be implemented by different processors in a chip system.

An embodiment of this application provides a non-access point device, including a processor and a transceiver.

The processor is configured to invoke a computer program to implement the actions performed by the non-access point device in the foregoing method embodiments in collaboration with the transceiver.

Figure 16:
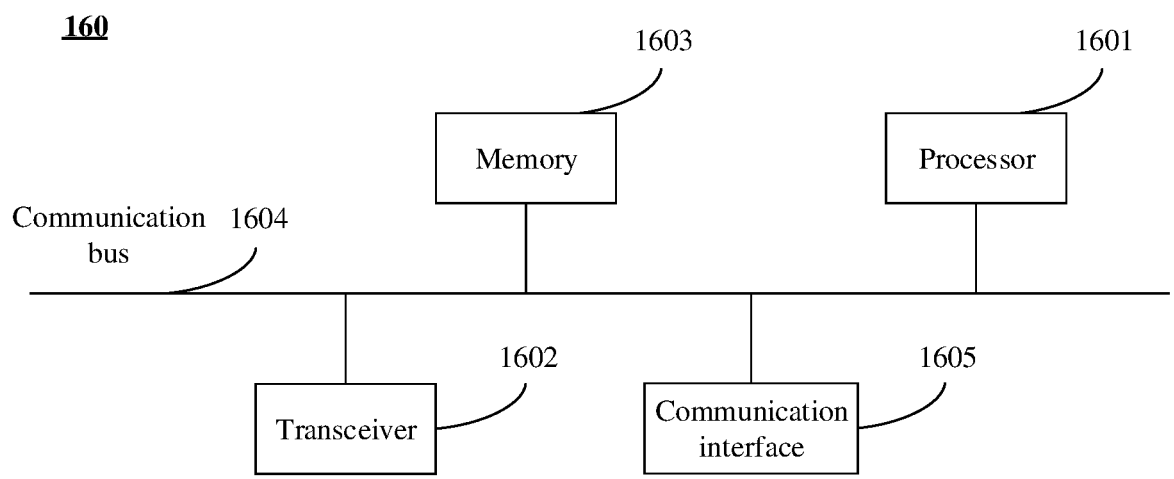
FIG. 16 is a block diagram of a non-access point device according to an embodiment of this application.

For example, FIG. 16 is a block diagram of the non-access point device according to this embodiment of this application. As shown in FIG. 16, the non-access point device 160 includes a processor 1601 and a transceiver 1602. The transceiver 1602 is configured to perform, under control of the processor 1601, receiving and sending actions performed by the non-access point device in the foregoing method embodiments.

Optionally, the non-access point device 160 further includes a memory 1603, a communication bus 1604, and a communication interface 1605.

The processor 1601 may be a general-purpose CPU, an ASIC, or one or more integrated circuits configured to control program execution of the solutions of this application.

The communication bus 1604 may include a path for transmitting information between the foregoing components.

The memory 1603 may be a ROM or another type of static storage device that can store static information and instructions, or a RAM or another type of dynamic storage device that can store information and instructions, or may be an EEPROM, a CD-ROM or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of instructions or a data structure and that can be accessed by a computer. However, this is not limited thereto. The memory 1603 may exist independently, or may be connected to the processor 1601 through the communication bus 1604. Alternatively, the memory 1603 may be integrated with the processor 1601.

The memory 1603 is configured to store program code for executing the solutions of this application, and the processor 1601 controls execution. The processor 1601 is configured to execute the program code stored in the memory 1603. The program code may include one or more software modules. The one or more software modules may be the software module provided in any embodiment in FIG. 13 or FIG. 14.

The communication interface 1605 uses the transceiver 1602 and is configured to communicate with another device or a communication network, for example, an Ethernet, a RAN, or a WLAN.

During specific implementation, in an embodiment, the non-access point device may include a plurality of processors. Each of the processors may be a single-core processor, or may be a multi-core processor. The processor herein may be one or more devices, circuits, and/or processing cores configured to process data (for example, computer program instructions).

During specific implementation, the non-access point device may be a wireless terminal, for example, a mobile phone, a computer, or an intelligent wearable device.

Optionally, the non-access point device is a non-access point multi-link device. A plurality of non-AP STAs included in the non-access point multi-link device are independent of each other at a low MAC layer and a PHY layer, and are also independent of each other at a high MAC layer. Alternatively, a plurality of non-AP STAs included in the non-access point multi-link device are independent of each other at a low MAC layer and a PHY layer, and share a high MAC layer. An internal structure of the non-access point multi-link device is not limited in this embodiment of this application. For example, the high MAC layer or the low MAC layer may be implemented by one processor in a chip system of the non-access point multi-link device, or may be implemented by different processors in a chip system.

An embodiment of this application further provides a communication system in a wireless local area network. The communication system includes the access point device shown in FIG. 11, FIG. 12, or FIG. 15, and the non-access point device shown in FIG. 13, FIG. 14, or FIG. 16.

An embodiment of this application further provides a computer storage medium. The computer storage medium stores instructions. When the instructions are executed by a processor of a computer device, actions performed by the access point device or the non-access point device in the foregoing method embodiments are implemented.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

In embodiments of this application, the terms "first", "second", and "third" are merely used for description, but cannot be understood as an indication or implication of relative importance.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are only optional embodiments of this application, but are not intended to limit this application. Any modification, equivalent replacement, or improvement made within the concept and principle of this application should fall within the protection scope of this application.

What is claimed is:

1. A method in a wireless local area network, the method comprising:
receiving, by a non-access point device, a first frame from an access point device, wherein the first frame comprises one or more groups of access point parameters, at least one group of the one or more groups of access point parameters comprises parameters of a plurality of access points belonging to one neighbor device of the access point device, the one neighbor device is a access point multi-link device, and the non-access point device is associated with the access point device; and
wherein the first frame comprises one or more neighbor report elements, and each of the neighbor report elements comprises one group of the access point parameters; and
wherein for each group of access point parameters that comprises parameters of a plurality of access points, a parameter of one access point in the plurality of access points is in the neighbor report element, and a parameter of another access point in the plurality of access points is in a subelement of the neighbor report element.

2. The method according to claim 1, wherein the access point device is an access point multi-link device.

3. The method according to claim 1, wherein the non-access point device is a non-access point multi-link device.

4. The method according to claim 1, further comprising: parsing, by the non-access point device, the first frame.

5. The method according to claim 1, wherein the first frame further comprises a first indication, and the first indication indicates a type of the first frame.

6. The method according to claim 1, further comprising: sending, by the non-access point device, a second frame to the access point device, wherein the second frame requests to obtain a parameter of the one neighbor access point of the access point device.

7. The method according to claim 6, wherein the second frame further comprises a second indication, and the second indication indicates a type of the second frame.

8. The method according to claim 6, wherein the second frame is a basic service set transition management (BTM) query frame, the second frame further comprises a third indication, and the third indication indicates that a reason why the non-access point device requests to obtain the parameter of the neighbor access point of the access point device comprises: the access point device does not have a capability of receiving data and sending data on different links simultaneously.

9. The method according to claim 1, wherein the first frame is a neighbor report response frame.

10. The method according to claim 1, further comprising:
sending, by the non-access point device, a basic service set transition management (BTM) response frame to the access point device.

11. The method according to claim 1, wherein each parameter of the parameters of the plurality of access points comprises a basic service set identifier of the access point.

12. The method according to claim 1, wherein the first frame is a basic service set transition management (BTM) request frame.

13. A non-access point device, comprising:
a processor; and
a transceiver;
wherein the processor is configured to invoke a computer program, and the computer program, when invoked by the processor, causes the non-access point device to:
receive a first frame from an access point device, wherein the first frame comprises one or more groups of access point parameters, at least one group of the one or more groups of access point parameters comprises parameters of a plurality of access points belonging to one neighbor device of the access point device, the one neighbor device is a access point multi-link device, and the non-access point device is associated with the access point device; and
wherein the first frame comprises one or more neighbor report elements, and each of the neighbor report elements comprises one group of the access point parameters; and
wherein for each group of access point parameters that comprises parameters of a plurality of access points, a parameter of one access point in the plurality of access points is in the neighbor report element, and a parameter of another access point in the plurality of access points is in a subelement of the neighbor report element.

14. The non-access point device according to claim 13, wherein the access point device is an access point multi-link device.

15. The non-access point device according to claim 13, wherein the non-access point device is a non-access point multi-link device.

16. The non-access point device according to claim 13, wherein the computer program, when invoked by the processor, causes the non-access point device to:
parse the first frame.

17. The non-access point device according to claim 13, wherein the first frame further comprises a first indication, and the first indication indicates a type of the first frame.

18. The non-access point device according to claim 13, wherein the computer program, when invoked by the processor, causes the non-access point device to:
send a second frame to the access point device, wherein the second frame requests to obtain a parameter of a neighbor access point of the access point device.

19. The non-access point device according to claim 18, wherein the second frame further comprises a second indication, and the second indication indicates a type of the second frame.

20. The non-access point device according to claim 18, wherein the second frame is a basic service set transition management (BTM) query frame, the second frame further comprises a third indication, and the third indication indicates that a reason why the non-access point device requests to obtain the parameter of the neighbor access point of the access point device comprises: the access point device does not have a capability of receiving data and sending data on different links simultaneously.

* * * * *